United States Patent
Aramli

(10) Patent No.: US 9,723,932 B2
(45) Date of Patent: Aug. 8, 2017

(54) MATTRESS MOUNT UNIT WITH HEIGHT EXTENDING LINKS THAT ADJUST A RISER DISTANCE BETWEEN A BASE AND AN AIR CONDUIT CLAMP

(71) Applicant: Mark Aramli, Newport, RI (US)

(72) Inventor: Mark Aramli, Newport, RI (US)

(*) Notice: Subject to any disclaimer, the term of this patent is extended or adjusted under 35 U.S.C. 154(b) by 0 days.

(21) Appl. No.: 14/992,640

(22) Filed: Jan. 11, 2016

(65) Prior Publication Data
US 2017/0196367 A1    Jul. 13, 2017

(51) Int. Cl.
| | |
|---|---|
| A47C 21/00 | (2006.01) |
| A47C 21/04 | (2006.01) |
| F16L 3/00 | (2006.01) |
| F16L 3/02 | (2006.01) |
| A47C 21/02 | (2006.01) |

(52) U.S. Cl.
CPC .......... *A47C 21/044* (2013.01); *A47C 21/022* (2013.01); *A47C 21/048* (2013.01); *F16L 3/003* (2013.01); *F16L 3/02* (2013.01)

(58) Field of Classification Search
CPC ... A47C 21/044; A47C 21/048; A47C 21/022; F16L 3/003; F16L 3/02
USPC ............................................. 248/75; 5/503.1
See application file for complete search history.

(56) References Cited

U.S. PATENT DOCUMENTS

| | | | | |
|---|---|---|---|---|
| 4,141,524 A | * | 2/1979 | Corvese, Jr. ......... | A61G 7/0503 128/DIG. 26 |
| D260,850 S | * | 9/1981 | Greenblatt ................... | D24/128 |
| 5,787,530 A | * | 8/1998 | Brix ....................... | A61G 7/053 5/424 |
| 6,179,260 B1 | * | 1/2001 | Ohanian .................. | A61G 7/05 248/219.4 |
| D503,231 S | * | 3/2005 | Daugherty ................... | D24/128 |
| 7,258,310 B2 | * | 8/2007 | Norris ...................... | A61G 5/10 248/125.7 |
| 7,766,289 B2 | * | 8/2010 | Newkirk ................ | A61G 7/018 248/176.1 |
| 2015/0122956 A1 | * | 5/2015 | Aramli ................. | A47C 21/048 248/70 |

* cited by examiner

*Primary Examiner* — Todd M Epps
(74) *Attorney, Agent, or Firm* — Hess Patent Law Firm; Robert J. Hess

(57) ABSTRACT

A mattress mount unit that grasps a periphery of an air hose and that clips onto a bed sheet to prevent relative movement of the hose with respect to the bed sheet and that has a mattress mount base the lies beneath a mattress. The separation distance between the grip and the mattress mount base is defined by a plurality of height extension links that snap lock with each other, but which can be released from the snap lock position to remove or add height extension links as needed.

19 Claims, 6 Drawing Sheets

MATTRESS MOUNT UNIT WITH HEIGHT EXTENDING LINKS THAT ADJUST A RISER DISTANCE BETWEEN A BASE AND AN AIR CONDUIT CLAMP

CROSS-REFERENCE TO COPENDING PATENT APPLICATIONS (1) U.S. design patent application Ser. No. 29/501,652 filed Sep. 5, 2014 entitled "AIR DELIVERY OUTLET NOZZLE".

(2) U.S. design patent application Ser. No. 29/501,656 filed Sep. 5, 2014 and entitled "HOUSING FOR A CLIMATE CONTROL APPARATUS".

(3) U.S. utility patent application Ser. No. 14/534,537 filed Nov. 6, 2014 and entitled "REMOTE OPERATION OF A BEDDING CLIMATE CONTROL APPARATUS".

(4) U.S. utility patent application Ser. No. 14/534,494 filed Nov. 6, 2014 and entitled "BEDDING CLIMATE CONTROL APPARATUS WITH FORCED AIRFLOW FOR HEATING AND VENTILATING".

(5) U.S. utility patent application Ser. No. 14/534,736 filed Nov. 6, 2014 and entitled "RETENTION UNIT TO GRASP AN AIR HOSE AND CLAMP ONTO BED SHEETS AND METHODS FOR MANUFACTURE AND OPERATION THEREOF".

BACKGROUND OF THE INVENTION

Technical Field of the Invention

The invention relates to a mattress mount unit that is equipped with a base that lies under a mattress and a hose grip that grasps an air conduit. Clips are attached to an exterior facing side of the hose grip to clip onto a bedding sheet. Such a unit has been commercialized under the tradename BEDJET by BEDJET LLC of Rhode Island. The present inventor has developed a mechanism to adjust a separation distance between the hose grip and the mattress mount base.

SUMMARY OF THE INVENTION

One aspect of the invention resides in a mattress mount apparatus that has components that include a hose grip, a mattress mount base and at least one height extension link that defines a separation distance between the hose grip and the mattress mount base. The components each have formations that including surfaces that are slid to abut each other into a snap lock condition and that may be moved under manual pressure to separate from each other so as to leave the snap lock condition to enable the components to be pulled apart from each other.

BRIEF DESCRIPTION OF THE DRAWING

For a better understanding of the present invention, reference is made to the following description and accompanying drawings, while the scope of the invention is set forth in the appended claims.

DETAILED DESCRIPTION OF THE INVENTION

Figure 1:
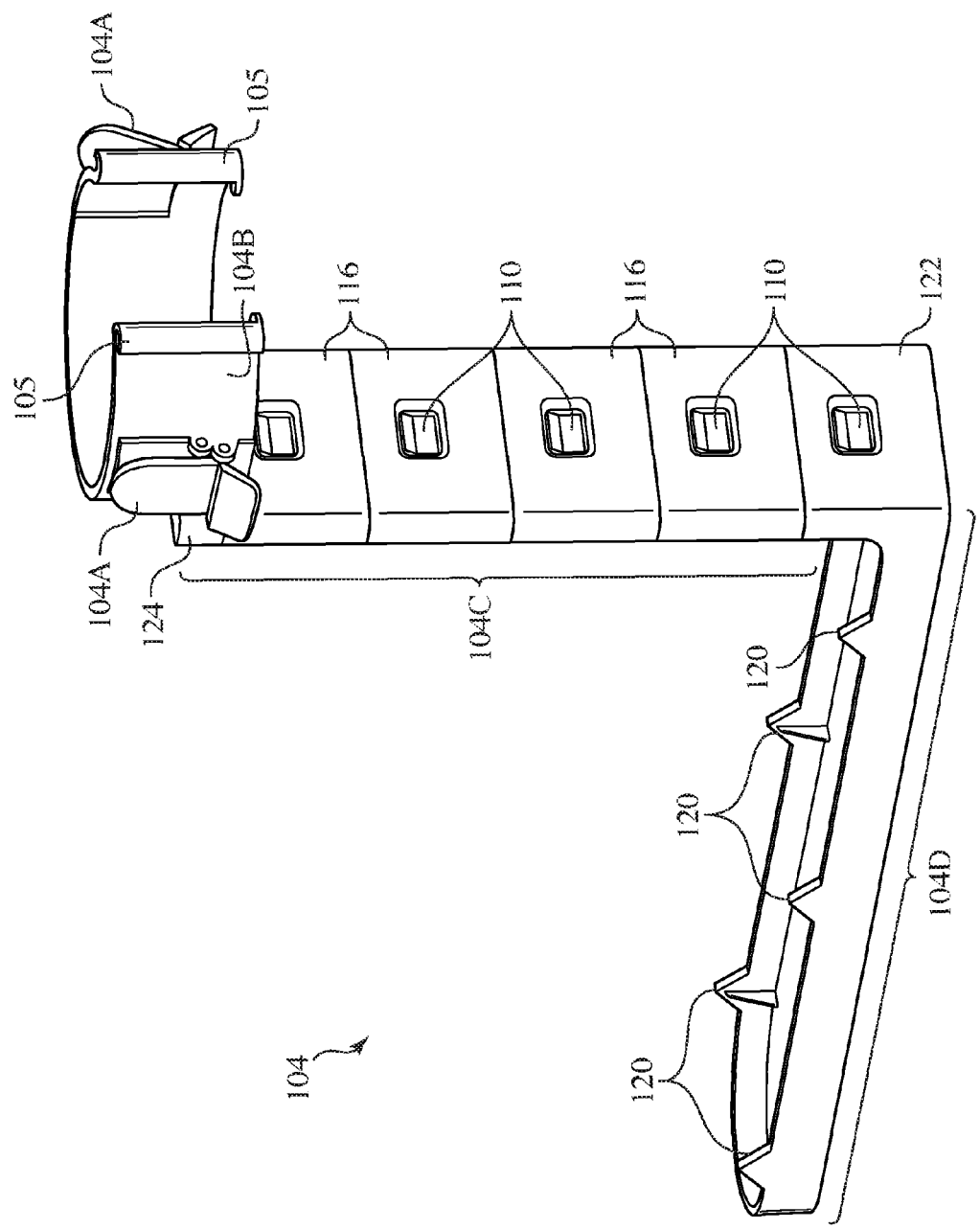
FIG. 1 is an isometric view the top, front and right side of the mattress mount unit in accordance with an embodiment of the invention that includes a base, a riser having a plurality of height extension links snap locked to each other in a releasable manner, a clamp that grasps onto an air conduit and clips that clip onto a bed sheet.
Figure 2:
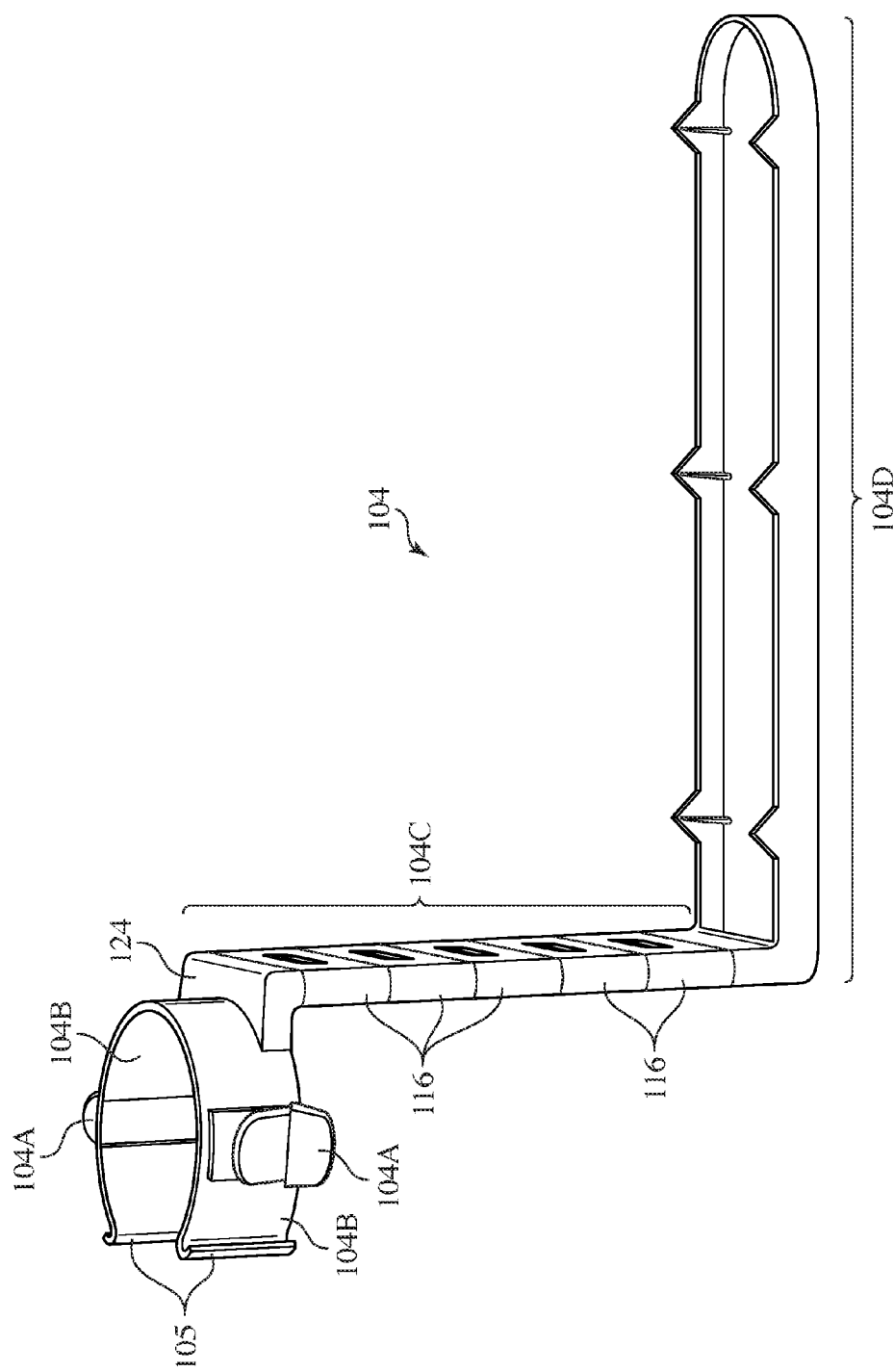
FIG. 2 is an isometric view of the top, rear and left side of the mattress mount unit of FIG. 1.
Figure 3:
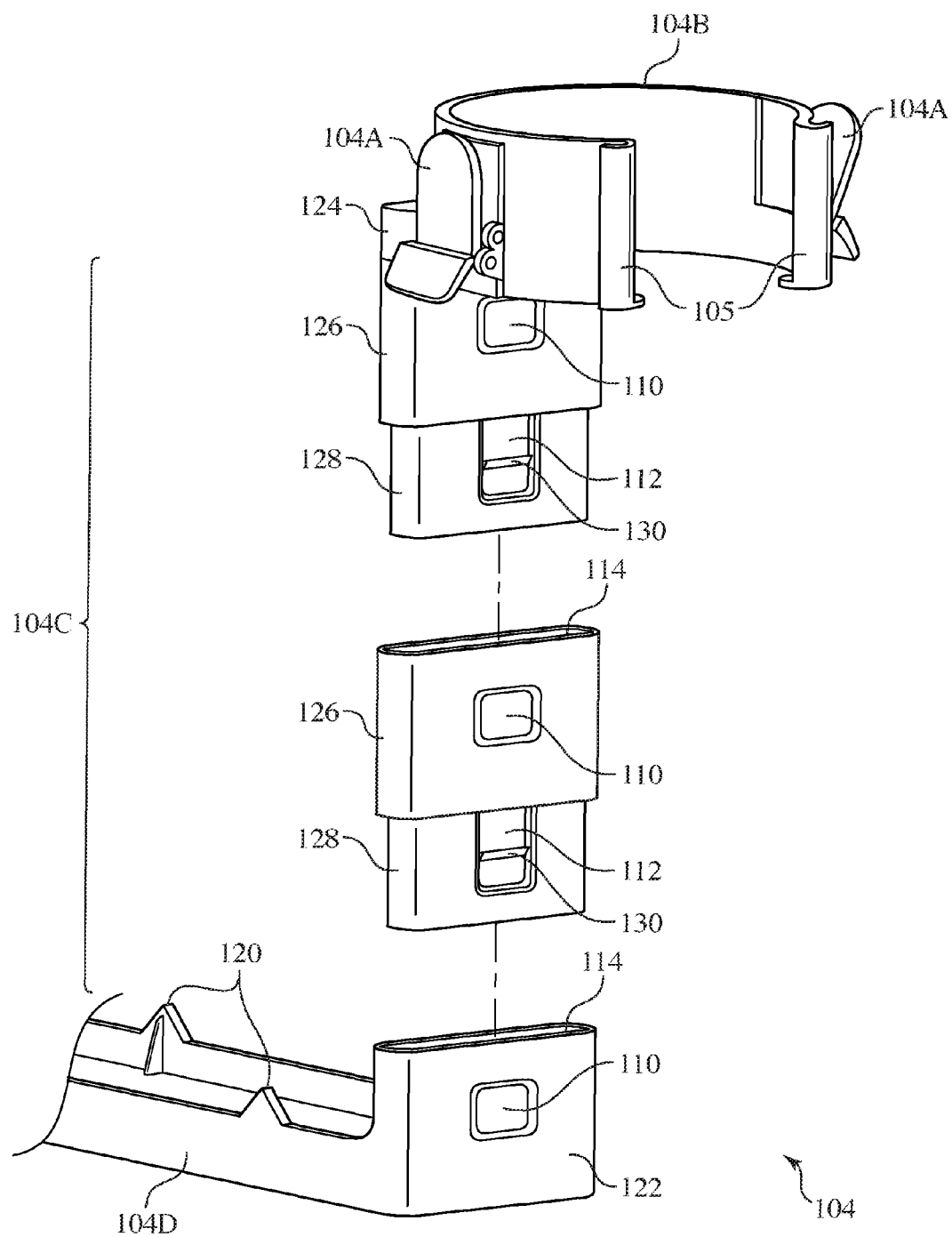
FIG. 3 is an exploded isometric view of the bed sheet mattress mount unit of FIG. 1.
Figure 4:
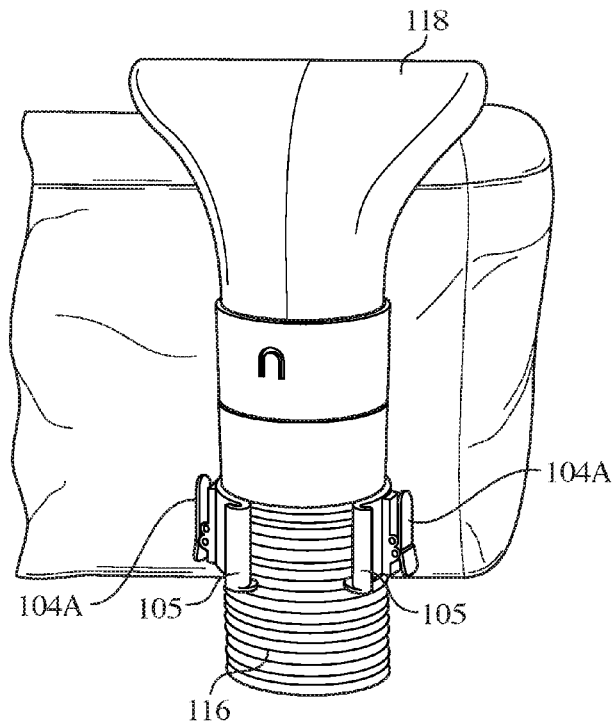
FIG. 4 is an isometric view showing the clamp of the mattress mount unit of FIG. 1 in position clamping the air hose at a location adjacent to an underside of the collar of the air hose.
Figure 5:
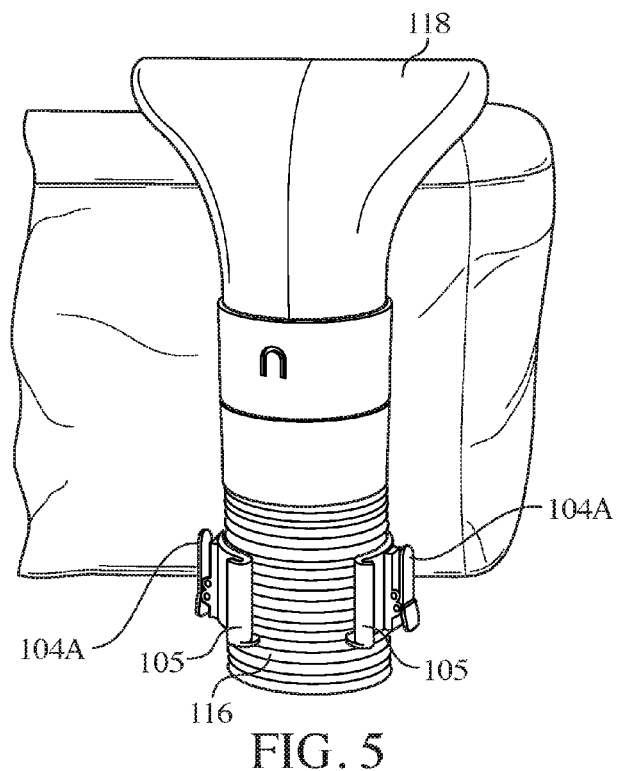
FIG. 5 is an isometric view as in FIG. 4 showing the clamp of the mattress mount unit of FIG. 1 in position clamping the hose at a location spaced from the collar of the air hose.
Figure 6:
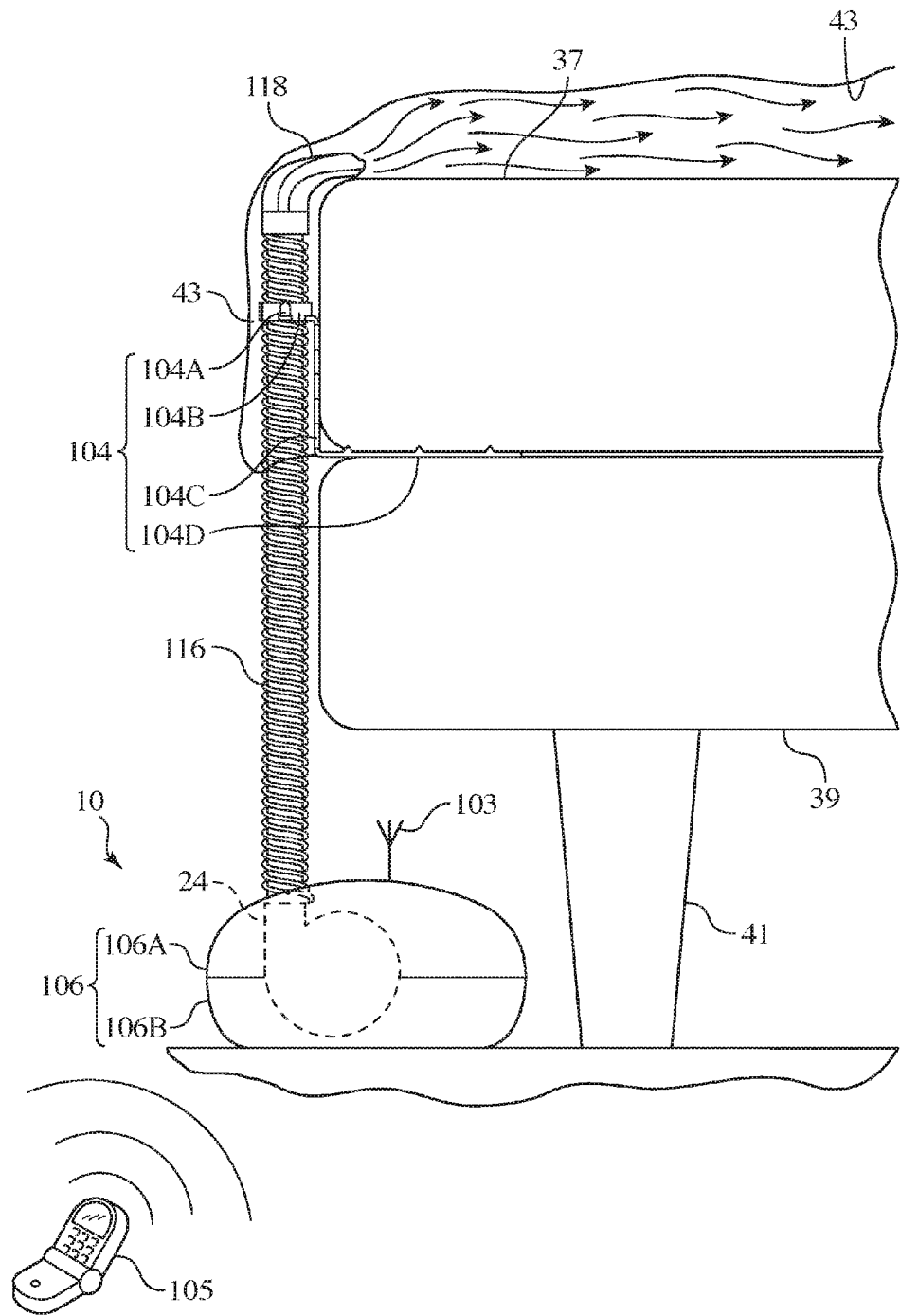
FIG. 6 is a schematic view of the assembly of the mattress mount unit clamped to the hose of a bedding climate control apparatus in the manner of FIG. 4 and clipped onto bed sheets of a conventional bed, which has a mattress atop a box spring with the base of the mattress mount unit between the mattress and the box spring.
Figure 7:
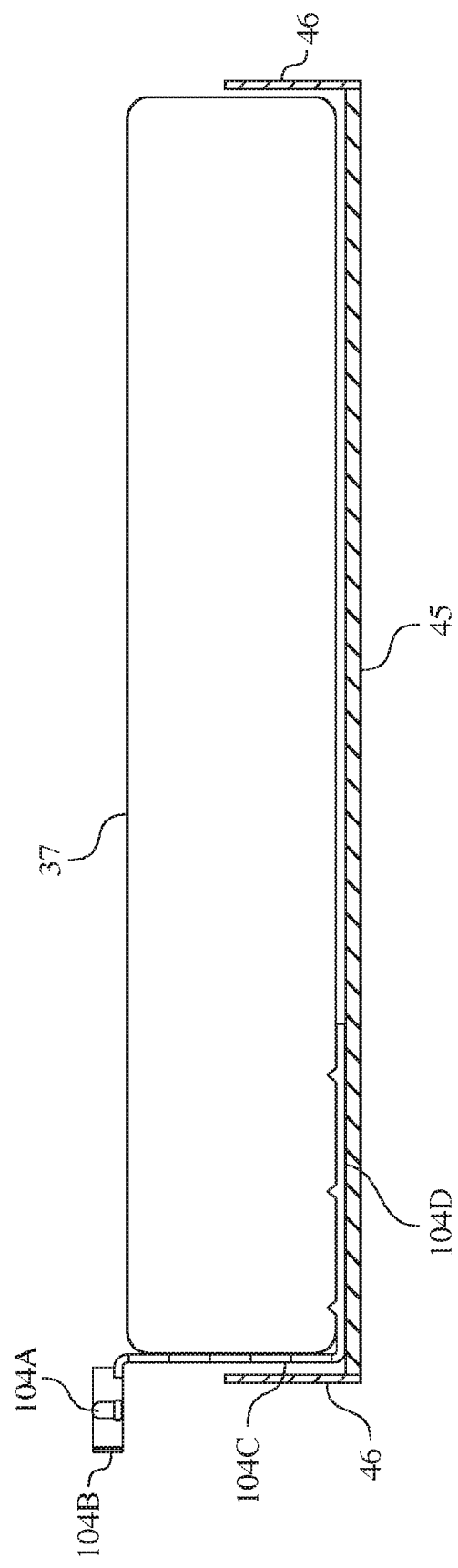
FIG. 7 is a schematic view of the assembly of the adjustable clamp unit held in position with its base under mattress for a platform bed.

Turing to the drawing, FIGS. 1-5 show a mattress mount apparatus in the form of an adjustable hose mattress mount unit 104 that has two clips 104A, a conduit/hose grip clamp 104B, an adjustable riser 104C, and a mattress mount base 104D. The two clips 104A are preferably located diametrically opposite each other and are attached to the exterior facing side of the convexly curved arms of the conduit/hose grip clamp 104B (FIGS. 1, 2, 4). FIGS. 6 and 7 show the mattress mount apparatus of FIGS. 1-5 installed at the foot end of a bed.

Air Delivery Nozzle Positioning

Before installing the adjustable hose mattress mount unit 104, the location for the air delivery nozzle 118 at the foot of the bed needs to be decided based on one's own preferences for heating and cooling and on limitations imposed by the bed frame. For instance, the bed frame may interfere with placement of the air conduit or air hose 116.

To favor warming and cooling the left side of the bed, the air delivery nozzle 118 is positioned to blow from the left side at the foot of the bed or from the left side of the bed by the foot of the bed. To favor warming and cooling the right side of the bed, the air delivery nozzle 118 is positioned to blow from the right side at the foot of the bed or from the right side of the bed by the foot of the bed. To favor warming and cooling the center of the bed (between the left and right sides), the air delivery nozzle 118 is positioned to blow from the center at the foot of the bed.

Assembly

The air delivery nozzle 118 needs to be assembled onto the air hose 116. This assembly is accomplished by stretching and compressing the air hose 116, which preferably can be expanded, contracted and bent to retain any desired shape.

The adjustable hose mattress mount unit 104 is then assembled. As shown in FIGS. 4-5, the air conduit or air hose 116 is fitted within the internal opening defined by the conduit/hose grip clamp 104B. The arms of the conduit/hose grip clamp 104B are concavely curved and grasp the outer periphery of the air conduit or air hose 116 by partially encircling under tension the outer circumference of the air hose 116. The adjustable riser 104C has at least one height extension link 116 between a lower link base 122 of the mattress mount base 104D and an upper base link 124 of the conduit/hose grip clamp 104B. Each height extension link 116 and lower link base 122 has an opening 110. Each height extension link 116 and upper link base 124 has a press tab 112.

The press tab 112 has a flexible tongue with a projection 130 that extends outwardly across a width of the flexible tongue and is spaced from the distal end of the flexible tongue. The projection 130 may have a rectangular cross-section or a right triangular cross-section with the flat (non-inclined) side facing the edge of the opening 110 (of another link 116 or upper base 124) against which the projection 130 abuts. The projection 130 may have instead other geometric shapes such as semicircular or polygonal cross-section. The press tab 112 is within confines of a recess but the projection 130 preferably extends beyond the recess when the press tab 112 is in a relaxed, non-pressed condition.

Each extension link 116 has a wider portion 116 with the opening 110 in a central location and has a narrower portion 118 adjacent that has centrally located recess with the press tab 112. The wider portion 116 and the lower base 122 each has a respective slot 114 at its upper end that can accommodate insertion of the lower end of a narrower portion 118 of another extension link 116 or of the upper base 124.

Snap Lock and Release Procedure

To snap lock, the lower end of the narrower portion 118 is inserted into the slot 114 of the lower base 122 until the press tab 112 aligns with the opening 110 in the lower base 122 such that the projection 130 snap locks the narrower portion 118 to the lower base 122. The snap lock arises from the projection 130 abutting an edge of the opening 110. The projection 130 preferably has a right triangular cross-section so that the extension links 116 may slide onto each other into a snap locked condition. To release from the snap lock condition, the press tab 112 is manually pressed inward to release the projection 130 from its abutting relation with the edge of the opening 110 to enable the extension links 116 to be puled apart.

The snap lock and release procedure for joining and releasing the lower base 122 and an extension link 116 to and from each other applies as well in the same manner for joining and releasing two extension links 116 to and from each other and for joining the upper base 124 and an extension link 116 to and from each other.

The mattress mount base 104D, the conduit/hose grip clamp 104B and at least one extension link 116 constitute components, any two of which being movable between a snap locked condition and a freed condition relative to each other. The snap locked position arises from abutment of a projection 130 of a flexible tongue 112 with an edge of an aligned opening 110. The freed condition arises from separation of the projection 130 from the edge of the aligned opening (resulting from manual depression of the flexible tongue 112) by an extent sufficient for the projection 130 to clear the edge of the aligned opening 110.

Conduti/Hose Grip Clamp

The conduit/hose grip clamp 104B may be closed to grasp about a periphery of the hose 116 to prevent horizontal movement of the air hose 116. If the conduit/hose grip clamp 104B is corrugated on its inward facing side, the corrugations are sized to enter grooves on the exterior of the air hose 116 to retain the air hose 116 in position against relative vertical movement where the retention takes place.

Mattress Mount Base

The mattress mount base 104D is elongated and is positioned to lie beneath the mattress to provide firm support for the performance of its retaining and holding functions. The mattress mount base 104D has a plurality of triangular-shaped teeth 120 that tend to retard lateral movement of the mattress mount base 104D relative to the mattress after the mattress rests upon the triangular-shaped teeth 120 and the topside of the mattress mount base 104D.

The mattress mount base 104D secures the assembly of the air hose 116 and air delivery nozzle 118 against the side of the bed. The mattress mount base 104D should be slid as deeply as possibly under the mattress until the mattress mount base 104D is flush against the mattress.

The mattress mount base 104D preferably has at least a portion that is compressible or expandable such that if a space between the mattress and mattress base expands (between which is the mattress mount base 104D), the mount shall expand to fill the space and still stay fixed in place.

Riser

As can be appreciated from the drawing, the vertically extending riser segment 104C extends along an end of the mattress at the foot of a bed (or side of the bed by the foot). The vertically extending riser segment 104C is height adjustable by adding or removing one or more of the height extending links 126 and inserts 128 to adjust the elevation of the conduit/hose grip clamp 104B placement so that the bottom of the air delivery nozzle 118 rests on the top of the mattress.

Adjustment

The air hose 116 has a fabric section that is pushed onto the conduit/hose grip clamp 104B. The conduit/hose grip clamp 104B is configured to stretch elastically open to accept the air hose 116. The conduit/hose grip clamp 104B can be flush against the plastic hose cuff or not—both installation methods shown in FIG. 4 and FIG. 5 are good. When finished, the air delivery nozzle 118 should be resting on and project at least an inch onto the mattress surface. More height links 126 and inserts 128 should be added if the air delivery nozzle 118 flops off mattress too easily.

Bedding Climate Control Apparatus

FIG. 6 shows the bedding climate control apparatus 10 on a floor beneath a bed to blow forced air through the air hose 116 and out the air delivery nozzle 118 to enter space between a mattress 37, which would typically have a mattress fitted mattress sheet that covers the mattress 37 (i.e., the fitted mattress sheet covers the top, both sides, both ends and a portion of the underside of the mattress by opposite ends of the mattress), and a bed sheet 43 the overlays the fitted mattress sheet. The bed is partially shown, with its mattress 37 atop a box spring 39 elevated by a frame leg 41. The air hose 116 extends from the fan/blower discharge in the bedding climate control apparatus to rise to the air delivery nozzle 118 at the foot of the bed. The adjustable hose mattress mount unit 104 (see FIG. 3) has its mattress mount base 104D between the mattress 37 and the box spring 39. The vertically extending riser segment 104C (or rising portion) elevates the conduit/hose grip clamp 104B. The two clamps 104A are clamped to the bed sheet 43 to keep the bed sheet in place to overlay the air delivery outlet nozzle 118 and thus prevent the bed sheet from being pushed to the side off the air delivery outlet nozzle 118 by a person's feet while laying in bed. The air hose 116 is retained by the conduit/hose grip clamp 104B.

The bedding climate control apparatus 10 and the air hose 116 and the air delivery outlet nozzle 118 may be constructed and operated in accordance with that of U.S. utility patent application Ser. No. 14/534,537 and entitled "REMOTE SETTING AND OPERATION OF A BEDDING CLIMATE CONTROL APPARATUS WITH FORCED AIRFLOW FOR HEATING AND VENTILATING, whose contents are incorporated herein by reference, and with that of U.S. utility patent application Ser. No. 14/534,494 and entitled "BEDDING CLIMATE CONTROL APPARATUS WITH FORCED AIRFLOW FOR HEATING AND VENTILATING, whose contents are incorporated herein by reference. The air hose 116 may be a sleeved, such as that of U.S. Pat. No. D733,269 S.

Platform Bed Installation

FIG. 7 shows a partial view of a platform bed 45 used in place of the box spring 39 and frame leg 41 of FIG. 5. The mattress 37 rests on a base of the platform bed 45 so that the adjustable hose mattress mount unit 104 is positioned in a like manner except that the mattress mount base segment 104D lies between the underside of the mattress 37 and the topside of the base of the platform bed 45. Some platform beds have a peripheral lip 46 that extends upward about the periphery of the base. The vertically extending riser segment 104C elevates the conduit/hose grip clamp 104б to an elevation higher than the top of the lip 46 region of the conduit/hose grip clamp 104б that meets the top of the vertically extending riser segment 104C (or rising portion) clears the lip 46.

Configurations

Any kind of air conduit may be utilized in accordance with the invention as a substitute for the air hose 116 that is shown regardless of the shape or configuration of its diametrical cross-section be it circular, rectangular, triangular, pentagonal, hexagonal, octagonal, etc. The air conduit may be considered to terminate into an open end portion as reflected by the air delivery nozzle 118. The shape or configuration of the conduit/hose grip clamp 104B should complement the outer periphery of the air hose 116 or air conduit.

Although the drawings show a particular shape and configuration for the air delivery nozzle 118, any shape and configuration would suffice with the adjustable hose mattress mount unit 104 of the present invention. The two clamps 104A may be of any configuration suited to retain the bed sheets in position that keeps the bed sheet overlaying the air delivery nozzle 18.

The mattress mount base 104D is a kind of fixing portion in that it fixes the relative position of the rest of the retention unit when it is in position underneath a mattress that rests upon a surface. Such a fixing portion may be of a one piece unitary construction as shown or be in multiple elongated pieces with each as long as that depicted for the mattress mount base 104D but not as wide yet preferably arranged to lay side by side with each other.

The conduit/hose grip clamp 104B is configured to release the air hose 116 in response to transmission of a force from the air hose 116 to the conduit/hose grip clamp 104б of sufficient magnitude, such as that of the force exerted by the weight of person siting on the air hose 116. While the purpose of the conduit/hose grip clamp 104B is preferably to retain the air hose 116 in a relative position along a height of the mattress against inadvertent movement, it is not designed to withstand the full weight force of a person sitting on the air hose 116 that imparts an axial force on the conduit/hose grip clamp 104B that counters such a force. To avoid breakage of the assembly, the conduit/hose grip clamp 104B is configured to give way and release from gripping the air hose 116 in response to such a force imparted (such as a person's weight force) that beyond an acceptable limit that can be withstood without breakage of the assembly.

If desired, the snap lock and release procedure for joining and releasing could instead join the lower base 122 to the upper base 124 and forego the need to the extension link 116. Doing so may require lengthening of the lower base 22 and/or the upper base 124 by an amount equal to the length of one or more of the height extension links 126 and inserts 128 depicted in FIG. 3.

While the foregoing description and drawings represent the preferred embodiments of the present invention, various changes and modifications may be made without departing from the scope of the present invention.

What is claimed is:

1. A mattress mount apparatus, comprising:
an assembly of components selected from a group consisting of a mattress mount base, a grip clamp and at least one height extension link, the assembly including the mattress mount base and the grip clamp, the grip clamp being configured to grasp an air conduit in a releasable manner, said components having formations compatible with each other in a releasable manner to retain the mattress mount base to the grip clamp without the at least one height extension link being present and alternatively to retain the at least one height extension link to and between the mattress mount base and the grip clamp.

2. The apparatus of claim 1, wherein the assembly of components further includes at least one retention element configured to retain a bed sheet in a fixed position relative to the assembly of components.

3. The apparatus of claim 2, wherein the at least one retention element is attached to an exterior facing surface of the grip clamp.

4. The apparatus of claim 1, wherein the at least one height extension link has a slot at one end.

5. The apparatus of claim 1, wherein the grip clamp is configured to release the air conduit in response to transmission of a force from the air conduit to the grip clamp that exceeds a limit amount of force.

6. The apparatus of claim 1, wherein the mattress mount base has a plurality of further formations configured to retard lateral movement of the mattress mount base.

7. The apparatus of claim 6, wherein the further formations have triangular cross-sections that project from the mattress mount base.

8. The apparatus of claim 1, wherein the mattress mount base has a portion that is compressible or expandable to fill a space between a mattress and a mattress base beneath the mattress and still stay fixed in place.

9. The apparatus of claim 1, wherein the components each have a respective surface, the two of the components having formations compatible with each other in a releasable manner to move between a snap lock condition, with the respective surface of each of the two components in an abutting relationship with each other, and a freed condition, with the respective surface of each of the two components clear of the abutting relationship.

10. The apparatus of claim 1, wherein the formations include a flexible tongue having a projection, a slot and an access opening bounded by an edge, the tongue being movable into the slot to reach a snap lock condition at which the projection abuts the edge of the access opening, the tongue being accessible via the access opening to be manually flexed inward to clear the projection from the edge of the access opening, at least one of the components having the slot and the access opening and at least another of the components having the tongue with the projection.

11. A mattress mount apparatus, comprising:
a plurality of components each having associated ones of respective surfaces and having respective formations, the respective formations of at least one of the components being compatible with the respective formations of at least another of the components in a releasable manner to move between a snap lock condition, with the associated ones of the respective surfaces being in an abutting relationship, and a freed condition, with the associated one of the respective surfaces being clear of the abutting relationship, the components being selected from a group consisting of:
a mattress mount base;
a grip clamp configured to grasp an air conduit in a releasable manner; and
at least one height extension link that is positioned to define a separation distance between the mattress mount base and the grip clamp, wherein the plurality of components includes at least the mattress mount base and the grid clamp.

12. The apparatus of claim 11, wherein the grip clamp includes at least one retention element configured to retain a bed sheet in position relative to the assembly of components.

13. The apparatus of claim 12, wherein the at least one retention element is attached to an exterior facing surface of the grip clamp.

14. The apparatus of claim 11, wherein the at least one height extension link has a slot at one end.

15. The apparatus of claim 11, wherein the grip clamp is configured to release the air conduit in response to transmission of a force from the air conduit to the grip clamp that exceeds a limit amount of force.

16. The apparatus of claim 11, wherein the mattress mount base has a plurality of further formations configured to retard lateral movement of the mattress mount base relative to the mattress.

17. The apparatus of claim 16, wherein the further formations have triangular cross-sections that project from the mattress mount base.

18. The apparatus of claim 11, wherein the mattress mount base has a portion that is compressible or expandable to fill a space between a mattress and a mattress base beneath the mattress and still stay fixed in place.

19. The apparatus of claim 11, wherein the formations include a flexible tongue having a projection, a slot and an access opening bounded by an edge, the tongue being movable into the slot to reach the snap lock condition at which the projection abuts the edge of the access opening, the tongue being accessible via the access opening to be manually flexed inward to clear the projection from the edge of the access opening, at least one of the components having the slot and the access opening and at least another of the components having the tongue with the projection.

* * * * *